Patented Oct. 22, 1929

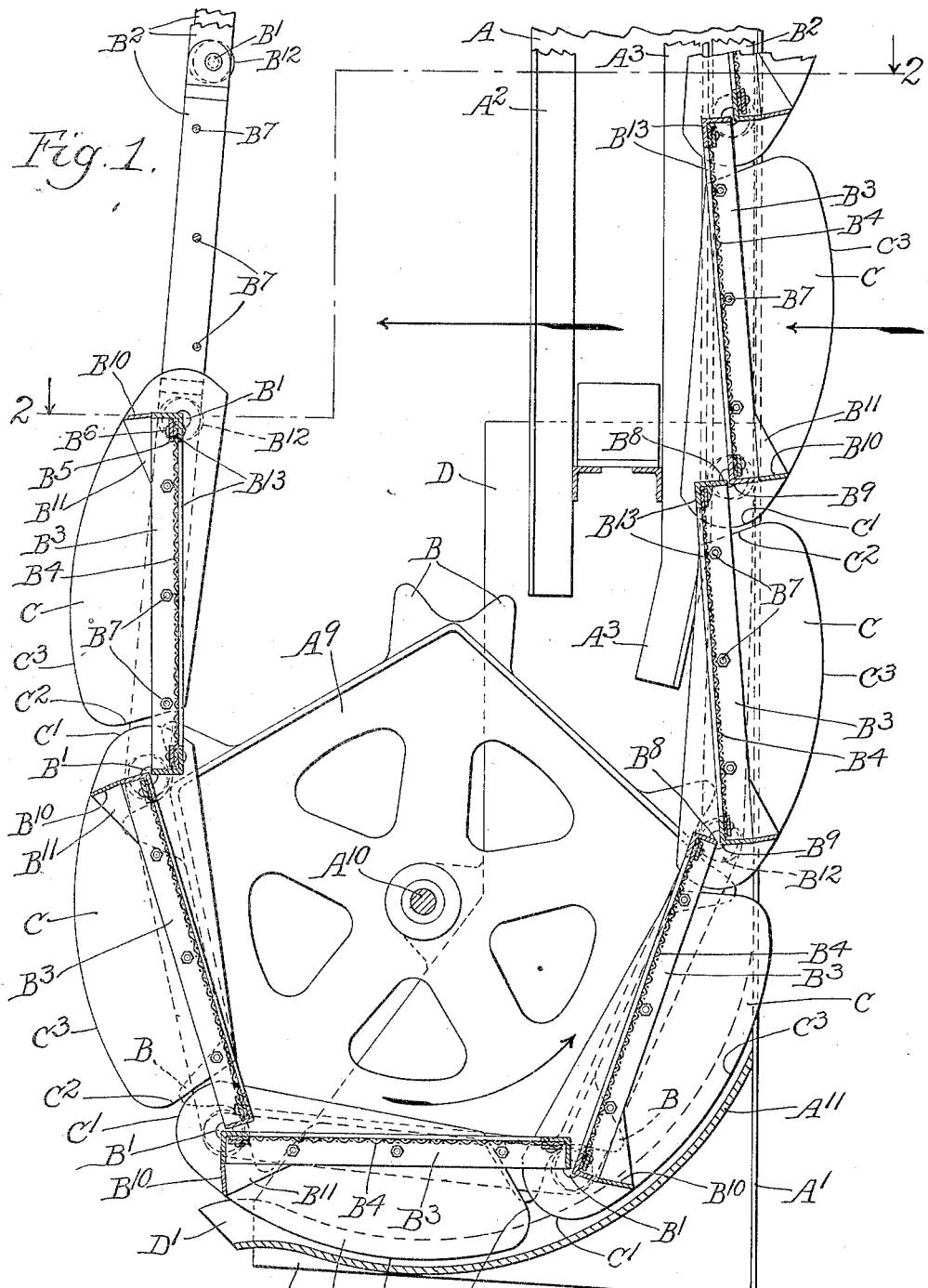

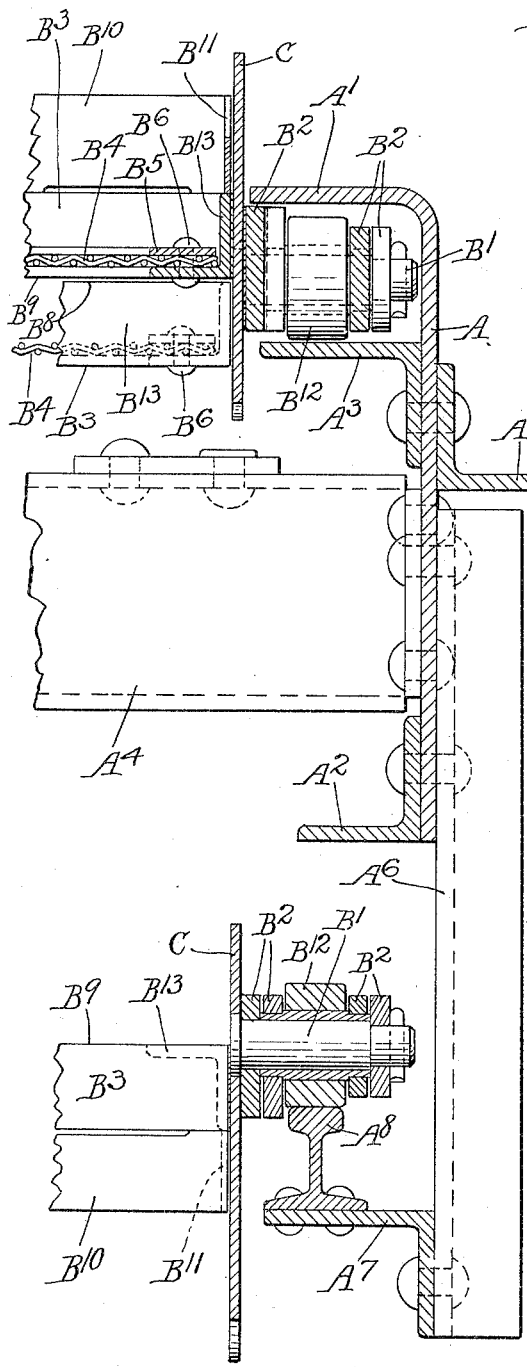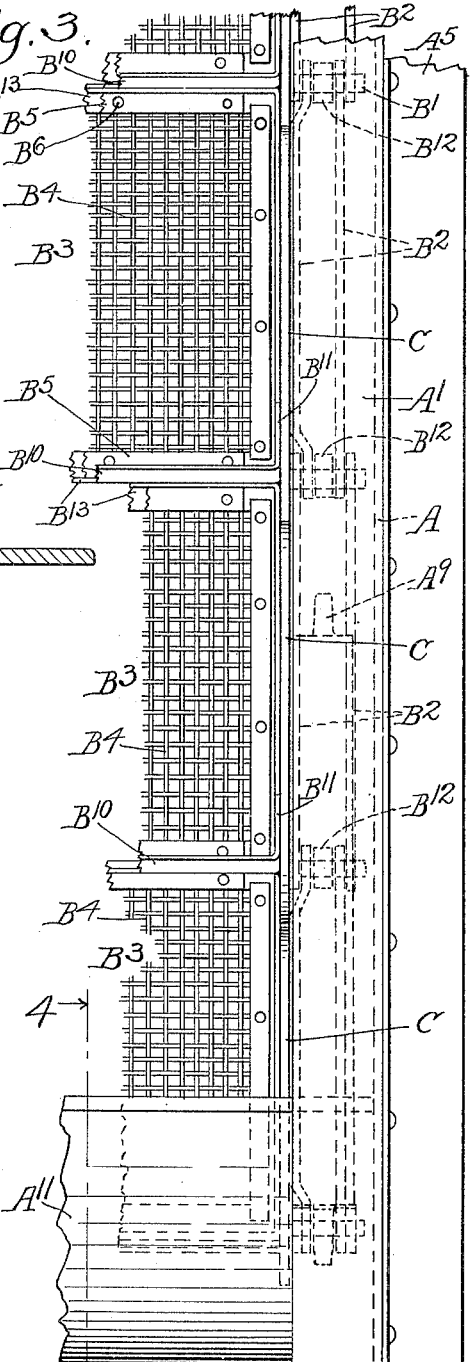

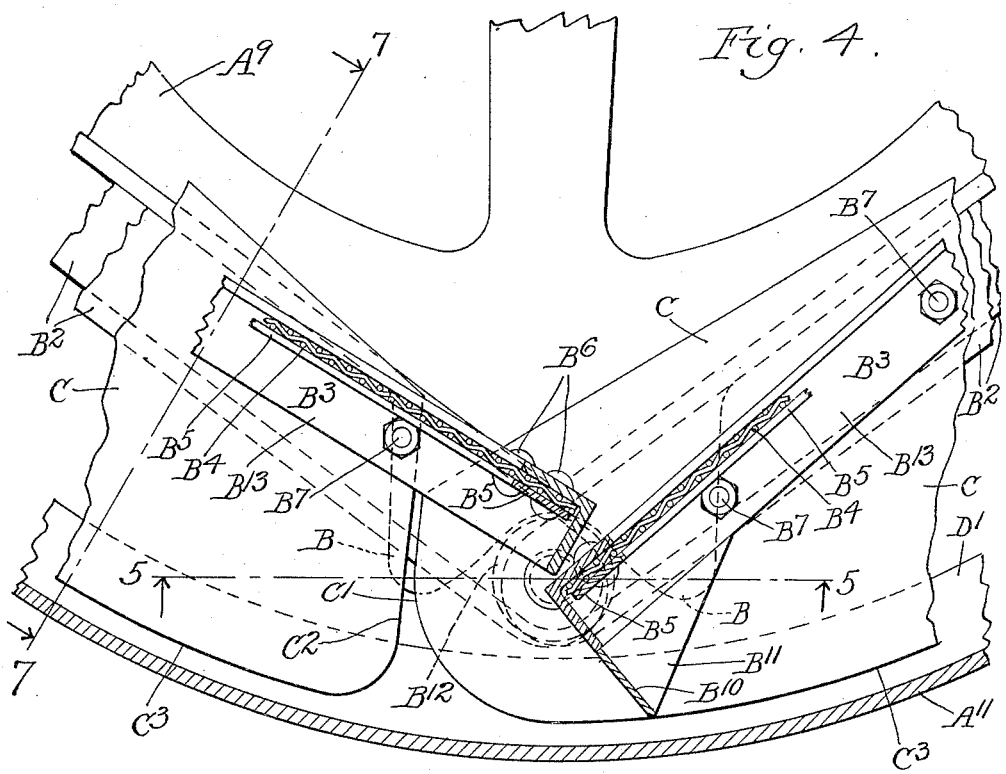
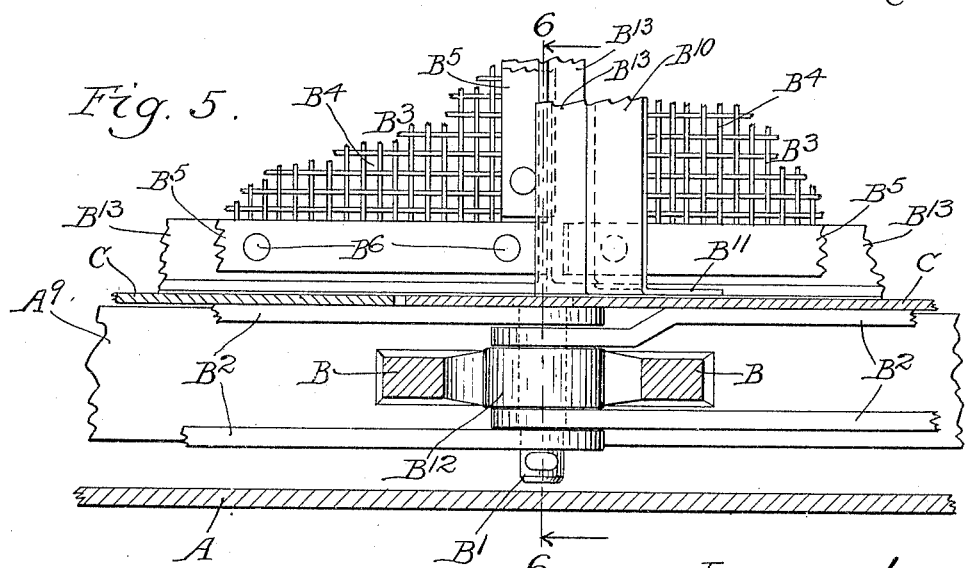

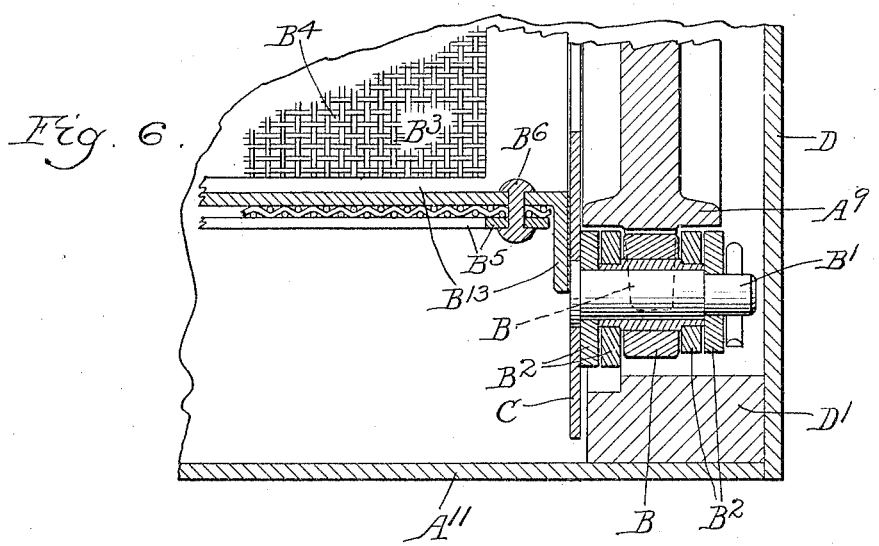
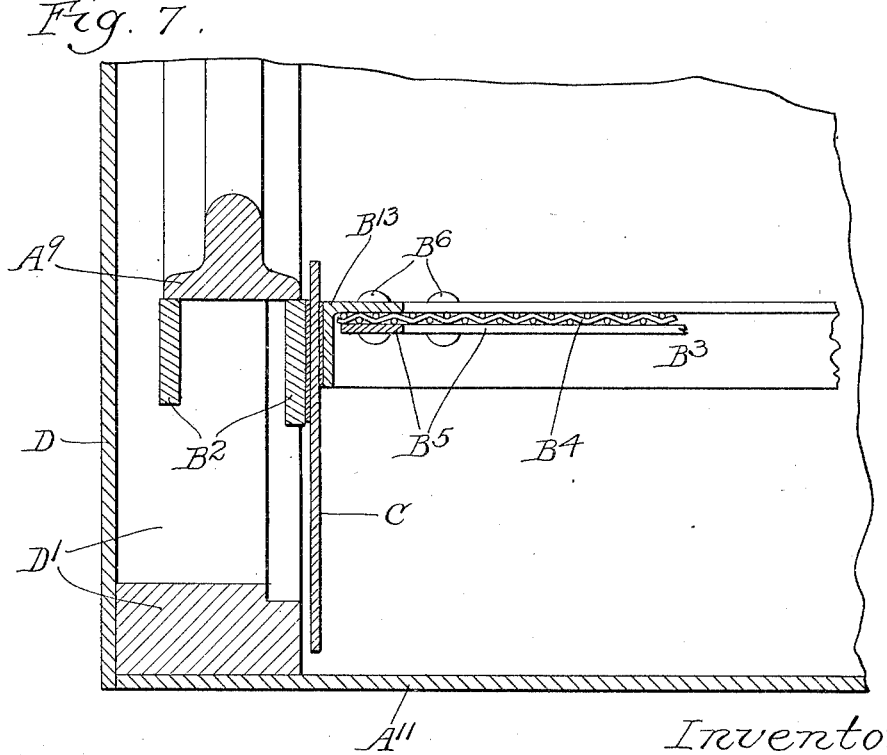

1,732,649

UNITED STATES PATENT OFFICE

CHARLES J. HOBART, OF CHICAGO, ILLINOIS, ASSIGNOR TO LINK-BELT COMPANY, OF CHICAGO, ILLINOIS, A CORPORATION OF ILLINOIS

TRAVELING WATER SCREEN

Application filed August 2, 1926. Serial No. 126,570.

My invention relates to improvements in traveling screens for screening sewage and the like and has for one object to provide a means for providing the by-passing of refuse laden water around the screen. The invention relates in general to that type of screen wherein a series of screen sections or panels are mounted on a chain or other traveling supporting member and caused to move gradually in a path across a flume or channel through which the water passes thereby straining or screening out of the water solid refuse material.

Since such panels while they may be flexibly supported are of necessity rigid and since they must endlessly travel across the flow of water, it is necessary for them to travel around a sprocket or guide and when they do this, considerable trouble develops in maintaining a tight connection around the edges of the panels to prevent by-passing of water. My invention therefore relates to means associated partly with the screen panels and partly with the fixed supports associated with them whereby the free flow of water around the panels and not through them may be substantially uninterrupted.

My invention is illustrated more or less diagrammatically in the accompanying drawings, wherein—

Figure 1 is a vertical section in a plane parallel with the flow of water, with parts omitted.

Figure 2 is a section along the line 2—2 of Figure 1;

Figure 3 is a detail side elevation of the screen apparatus with parts omitted and parts broken away;

Figure 4 is a section along the line 4—4 of Figure 3;

Figure 5 is a section along the line 5—5 of Figure 4;

Figure 6 is a section along the line 6—6 of Figure 5;

Figure 7 is a section along the line 7—7 of Figure 4.

Like parts are indicated by like characters throughout the specification and drawings.

The apparatus herein illustrated is adapted to be located in a flume or channel through which refuse laden water passes. This apparatus completely obstructs the channel so that in so far as possible all the water passes through the flume and the screen in the direction of the arrows shown in Figures 1 and 2. The screen travels in such manner that those screen sections on the side of the assembly which first receives the flow of water move upward, thus carrying out of the stream the refuse intercepted by the screen. Those panels on the down stream side of the assembly have no screening function. They are preferably clean before they start down and because the upstream side is doing the work they receive no refuse and they are merely on their way to the working point and any suitable guiding means for them which furnishes a minimum resistance to water flow is satisfactory. I have not illustrated the structure of the flume itself but only the metal or wood frame parts which would be positioned in the flume and which are required to carry the screening elements in proper working relation.

The framework which carries the screen assembly comprises a vertical plate A having an inwardly extending flange $A^1$ along its upstream edge and extending from top to bottom of the frame. This plate is stiffened at its rear end by an angle $A^2$ and has projecting outwardly from its inner face immediately behind the flange $A^1$ an angle $A^3$ which serves as a track or guide for the screen. This plate is tied up to a similar plate at the opposite side of the frame by a plurality of cross channels $A^4$ and is tied into the structure of the flume by an outwardly projecting angle $A^5$. $A^6$ is a frame member extending rearwardly from the plate A to carry a supporting angle $A^7$ on which is mounted a vertically disposed return track $A^8$. The track angle $A^3$ does not extend clear down to the bottom of the pit, it terminates at a point substantially on the line with the axis of rotation of the lower sprocket wheel $A^9$, which sprocket wheel is mounted on an axle shaft $A^{10}$ by any suitable bearing means not here illustrated as they form no part of my invention. Suffice it to say, that this sprocket wheel is as near to the bottom of the shaft or that part of the flume containing the screen as is conveniently possible. $A^{11}$ is a shield concentric with the shaft $A^{10}$ and extending from the forward edge of the plate A where it contacts the flange $A^1$ down to the bottom of the flume and to a point behind the vertical plane in which the axis of rotation of the sprocket is located. The flume is closed beneath this shield so that no water may escape thereby. The purpose of this shield is of course to reduce the escape of water beneath the sprocket and beneath the screen sections or segments as they pass over the sprockets to a minimum. The sprocket $A^9$ in this case is five-sided though it might have a different number of sides. The angles of intersection between adjacent sides may be provided with teeth B adapted to engage the rollers $B^{12}$ on the pintles $B^1$ of the chain, which chain is formed by side bars $B^2$. These side bars or link members are of substantially the same length as one side of the sprocket and carry the screen sections $B^3$, each screen section being of substantially the same length in direction of travel as the side of the sprocket and each screen section extending across the frame so that the sprockets on either end of the shaft carry the side bars of the two chains between which the screen panels are swung. These screen panels comprise rectangular frames $B^{13}$ and screen plates $B^4$ held in place by plates $B^5$ riveted or bolted as indicated at $B^6$. The ends of the frame members are bolted or riveted to the side bars $B^2$ as indicated at $B^7$ and are slightly inclined to the axis of the link so that as they pass through the channel of dirt laden water the upper edge is slightly behind the lower edge of the panel. The forward edge of the flange on the frame as at $B^8$ is located substantially in line with the center of the pintle, the rear surface of each panel projecting downwardly slightly behind the pintle center as at $B^9$ so as to come almost in contact with the edge $B^8$ and make a working closure of the space between the two screen panels at all operating positions of the panels. Extending forwardly from the lower edge of each frame $B^{13}$ is a basket lip $B^{10}$ having a skirt $B^{11}$ extending upwardly toward and terminating at the side wall of the screen panel. This basket lip is of such length that it extends out substantially to the shield $A^{11}$ as it travels with the sprocket thereabout. Each chain, there being one on either side of the flume, is thus contained between the track angle $A^3$ and the side guard or flange $A^1$ and extends out substantially to the sides of the screen panels. The chain roller $B^{12}$ riding on the pintle $B^1$ between the adjacent side bars $B^2$ is enclosed within the space formed between the track flange $A^3$ and the flange $A^1$.

Mounted on the side bars $B^2$ are curved side plates C, there being two plates associated with each screen panel, one at either end adjacent the side bars. These plates surround the pintle $B^1$ and terminate on the upper ends short of the center of the preceding pintle whereas they extend at their lower ends beyond the center of the rear pintle and are provided with a curved edge $C^1$ in opposition to a substantially straight edge $C^2$ on the succeeding plate, thus permitting articulation and rotation of the plates with respect to each other as the chain passes around the sprocket without providing a wide opening between the ends of the plates. The curvature of these plates along their outer edge is such as to conform to the curvature of the shield $A^{11}$ as indicated at $C^3$ and thus prevent passage of water around the links where they travel over the sprocket and are therefore spaced away from the shield. The relation between these two plates is such that as they pass around the sprocket, there is a very slight clearance between them at the point removed from the shield though that clearance increases from the center of rotation about the sprocket outwardly thereby rendering necessary additional means, subsequently to be described, to prevent flow of water around the shields. These curved plates also project forwardly alongside of and in front of the edge of the flange $A^1$ and project outwardly beyond the basket lips.

In order to prevent escape of refuse laden water around the bottom of the screen and immediately adjacent the spocket, the end plate D is associated with the shield $A^{11}$. This end plate extends up alongside of the sprocket at least as far upward as the axis of rotation thereof. This end plate is just outside of the sprocket and encloses it and is engaged by the shield $A^{11}$. However, the right angle made by the shield $A^{11}$ and the end plate leaves an open space through which water might under some conditions escape and it is desirable therefore to fill that space as full as possible. This filling is accomplished by a casting or filler block $D^1$ and which is segmental and of such shape as to fill so much of the space between the shield and the end plate as to leave just enough clearance as shown in Figure 6 for the chains, pintle and side link ends to pass. As shown in Figure 7, there is a considerable clearance between that part of the chains between the pintles but this does not result in the escape of any appreciable dirt laden water because the plates C come down in line with the end of the filler block D¹ thus making a very narrow tortuous passage through which little if any dirt laden water may escape. This filler block D¹ also fills the relatively large gap between the opposed ends of the adjacent plates C as indicated in Figure 4.

It will be evident that while I have shown in my drawings an operative device, still many changes might be made in the size, shape, arrangement and disposition of parts without departing materially from the spirit of my invention, and I wish therefore, that my showing be taken as in a broad sense diagrammatic.

It will be understood that my invention is not limited to any particular type of chain. Many different types of chain and many different chain links may be used. The chain link may be double, as shown, with the screen frame fastened to one link element or to both, or even to more than two, or there may be but a single link with the screen element and associated parts fastened to it.

I have used in some of the claims the word "pitch" as applied to the chain and by this word I refer to the section of the chain between two adjacent pintles. In other words in a double link chain, a pitch of chain would consist of two links which lie side by side each extending from one pintle to the next. Similarly if the chain is a single link chain a pitch of chain will constitute only a single link. The expression pitch therefore refers to a section of chain irrespective of its particular construction and irrespective of the type or number of links used.

It will be understood that my invention includes not merely the use of the double link chain as illustrated with the screen frame and associated parts attached to one link of the pair but also any arrangement where a screen or screen frame and other associated parts are so associated with the chain that there is a screen panel traveling with the chain mounted on it or forming a part of it and extending for a distance along the direction of travel of the chain equal substantially to one pitch length, that is equal to the distance from one chain pintle or line of chain articulation to the next.

In the drawings, for purposes of illustration, I have shown a screen frame with a screen mounted on it, the frame mounted on a link and the so-called basket lips and end plates built up and assembled with the screen frame and chain. Obviously the particular method of assembly and construction of these parts might be departed from and a device where one or more of the parts above referred to are made integral instead of being built up from separate elements would be equally included in my invention.

The use and operation of my invention are as follows:

The endless screen belt is driven by any suitable power not shown since they form no part of the invention, the driving power being normally applied through a head sprocket at the upper end of the run and the chains, there being one at either end to carry the screen sections up over the head sprocket, down along the back or down-stream side of the screen assembly, around the tail or lower sprocket and up along the upstream side where the screens operate to separate refuse from the water passing through. The refuse caught on the screens as they travel upwardly drops down on the basket lips and is discharged from the screen when the screen passes over the head sprocket at the upper end in the usual manner. The articulation of the adjacent screen sections with respect to the pintles of the chain is such that a very slight clearance between the edges of adjacent screens is provided. A clearance so small that no refuse can get through. The overhanging of the flange or guard plate which covers the chains extends to a point very close to the ends of the screen sections and prevents the passage of refuse to the water around the ends of the screen sections as they travel upwardly. The track flange is spaced slightly from the end of the screen so that if by chance any refuse does get through between the guard flange and the ends of the screen sections, such refuse will be quickly and easily passed out and therefore not have opportunity to clog or interfere with the operation of the chains. The shield concentric with the lower or tail pulley is so spaced from the basket lips on the screen sections that there is just sufficient clearance for them to pass around without escape of refuse between them and the guard. The end plates mounted one at either end of each screen section are also of such size that they just clear the guard and they prevent the escape of refuse laden water around the ends of the screen sections intermediate their edges where they are spaced away from the curved guard plate between the points where the pintles contact the sprocket. The filler block associated with the curved guard plate and located adjacent the path of the successive end plates insures at all times a tortuous passage around the end plates thereby minimizing the likelihood of refuse laden water passing around the ends of the screens.

I claim:

1. A panel for screening systems and the like comprising a rectangular frame, a screen mounted therein, a basket lip projecting forwardly from one edge thereof and side plates extending forwardly from opposed edges of each frame, the edges of the side plates at the point where they intersect the basket lip projected being substantially in line with the outer edge of the basket lip.

2. A panel for screening systems and the like comprising a rectangular frame, a screen mounted therein and end plates extending forwardly from opposed edges thereof and extending at one end beyond the edge of the frame and terminating at the other end short of the opposed edge of the frame.

3. A panel for screening systems and the like comprising a rectangular frame, a screen mounted therein and end plates extending forwardly from opposed ends thereof and extending at one end beyond the edge of the frame and terminating at the other end short of the opposed edge of the frame, one end of each end plate being outwardly and forwardly inclined, the other end of each plate being generally curved about the lower edge of the frame.

4. A screening system including a sprocket, a chain adapted to travel thereabout, screen panels mounted one on each pitch of the chain and of substantially the same width as the distance between the teeth of the sprocket, a guard plate concentric with the sprocket and adapted to lie adjacent the opposed edges of the screen panels where they are supported by the sprocket and means on the ends of the panels projecting downwardly toward the guard plate to close the space opened between the guard plate and the ends of the panels intermediate the sprocket teeth, said means on adjacent panels being so shaped and having their ends so interrelated as to maintain a substantially constant clearance between such ends independent of the relative angular position of the panels.

5. A screening system including a sprocket, a chain adapted to travel thereabout, screen panels mounted one on each pitch of the chain and of substantially the same width as the distance between the teeth of the sprocket, a guard plate concentric with the sprocket and adapted to lie adjacent the opposed edges of the screen panels where they are supported by the sprocket and end plates on the ends of the panels projecting downwardly toward the guard plate, their outer edges being curved concentric with the guard plate adapted to close the space opened between the guard plate and the ends of the panels intermediate the sprocket teeth, the end plates on adjacent panels being so related and shaped as to maintain a substantially constant clearance between their ends at all angular positions of the panels.

6. A screening system including a sprocket, a chain adapted to travel thereabout, screen panels mounted one on each pitch of the chain and of substantially the same width as the distance between the teeth of the sprocket, a basket lip on one edge of each panel, a guard plate concentric with the sprocket and adapted to lie adjacent the path of the working edge of the basket lip as it passes about the sprocket and means on the ends of the panels projecting downwardly toward the guard plate to close the space opened between the guard plate and the ends of the panels intermediate the sprocket teeth, said means on adjacent panels being so shaped and having their ends so interrelated as to maintain a substantially constant clearance between such ends independent of the relative angular position of the panels.

7. A screening system including a sprocket, a chain adapted to travel thereabout, screen panels mounted one on each pitch of the chain and of substantially the same width as the distance between the teeth of the sprocket, a basket lip on one edge of each panel, a guard plate concentric with the sprocket and adapted to lie adjacent the path of the working edge of the basket lip as it passes about the sprocket and end plates at the ends of the panels projecting downwardly toward the guard plate, their outer edges being curved concentric with the guard plate adapted to close the space opened between the guard plate and the ends of the panels intermediate the sprocket teeth, the outer working edges of end plates and basket lip being where they are in cooperation with it substantially equidistant from the guard plate.

8. A screening system including a sprocket, a chain adapted to travel thereabout, screen panels mounted one on each pitch of the chain and of substantially the same width as the distance between the teeth of the sprocket, a guard plate concentric with the sprocket and adapted to lie adjacent the opposed edges of the screen panels where they are supported by the sprocket and a side plate projecting upwardly from the guard plate perpendicular to the axis of rotation of the sprocket and a filler block resting on the guard plate and engaging the side plate to close the gap between them and the chain and sprocket.

9. A screening system including a sprocket, a chain adapted to travel thereabout, screen panels mounted one on each pitch of the chain and of substantially the same width as the distance between the teeth of the sprocket, a guard plate concentric with the sprocket and adapted to lie adjacent the opposed edges of the screen panels where they are supported by the sprocket and means on the ends of the panels projecting downwardly toward the guard plate to close the space opened between the guard plate and the ends of the panels intermediate the sprocket teeth, a side plate associated with the guard plate perpendicular to the axis of rotation of the sprocket and a filler block supported by the side plate and guard plate and adapted to fill the gap lying between the chain and sprocket and the two said plates.

10. A screening system including a sprocket, a chain adapted to travel thereabout, screen panels mounted one on each pitch of the chain and of substantially the same width as the distance between the teeth of the sprocket, a guard plate concentric with the sprocket and adapted to lie adjacent the opposed edges of the screen panels where they are supported by the sprocket and end plates on the ends of the panels projecting downwardly toward the guard plate, their outer edges being curved concentric with the guard plate adapted to close the spaced opened between the guard plate and the ends of the panels intermediate the sprocket teeth, a side plate associated with the guard plate perpendicular to the axis of rotation of the sprocket and a filler block supported by the side plate and guard plate and adapted to fill the gap lying between the chain and sprocket and the two said plates.

11. A screening system including a sprocket, a chain adapted to travel thereabout, screen panels mounted one on each pitch of the chain and of substantially the same width as the distance between the teeth of the sprocket, a basket lip on one edge of each panel, a guard plate concentric with the sprocket and adapted to lie adjacent the path of the working edge of the basket lip as it passes about the sprocket and means on the ends of the panels projecting downwardly toward the guard plate to close the space opened between the guard plate and the ends of the panels intermediate the sprocket teeth, a side plate associated with the guard plate perpendicular to the axis of rotation of the sprocket, and a filler block supported by the side plate and guard plate and adapted to fill the gap lying between the chain and sprocket and the two said plates.

12. A screening system including a sprocket, a chain adapted to travel thereabout, screen panels mounted one on each pitch of the chain and of substantially the same width as the distance between the teeth of the sprocket, a basket lip on one edge of each panel, a guard plate concentric with the sprocket and adapted to lie adjacent the path of the working edge of the basket lip as it passes about the sprocket and end plates on the ends of the panels projecting downwardly toward the guard plate, their outer edges being curved concentric with the guard plate adapted to close the space opened between the guard plate and the ends of the panels intermediate the sprocket teeth, a side plate associated with the guard plate perpendicular to the axis of rotation of the sprocket and a filler block supported by the side plate and guard plate and adapted to fill the gap lying between the chain and sprocket and the two said plates.

13. A screening system including a sprocket, a chain adapted to travel thereabout, screen panels mounted one on each pitch of the chain and of substantially the same width as the distance between the teeth of the sprocket, a guard plate concentric with the sprocket and adapted to lie adjacent the opposed edges of the screen panels where they are supported by the sprocket and a side plate projecting upwardly from the guard plate perpendicular to the axis of rotation of the sprocket and a filler block resting on the guard plate and engaging the side plate to close the gap between them and the chain and the sprocket, the filler block being cut away to permit clearance for the chain and sprocket to conform to the contour thereof.

14. A panel for screening systems and the like comprising a rectangular frame, a screen thereon, and a pivot support at each end thereof, an end plate projecting forwardly from one edge thereof, the end plate extending at one end beyond the pivot support, and terminating at the other end short of the pivot support.

15. A panel for screening systems and the like comprising a rectangular frame, a screen mounted thereon, and a pivot support at each end thereof, an end plate projecting forwardly from one edge thereof, the end plate extending at one end beyond the pivot support, and terminating at the other end short of the pivot support, the opposed ends of the end plate being complementary and so disposed that change in the relative angular positions of the adjacent end plates may take place while clearance between them remains substantially constant.

16. A screening system including a sprocket, a chain adapted to travel thereabout, screen panels mounted one on each pitch of the chain and of substantially the same width as the distance between the teeth of the sprocket, a basket lip on each panel, a guard plate concentric with the sprocket and adapted to lie adjacent the path of the working edge of the basket lip as it passes about the sprocket and means on the ends of the panels projecting downwardly toward the guard plate to close the space between the guard plate and the ends of the panels intermediate the sprocket teeth.

17. A screening system including a sprocket, a chain adapted to travel thereabout, screen panels mounted one on each pitch of the chain and of substantially the same width as the distance between the teeth of the sprocket, a basket lip on each panel, a guard plate concentric with the sprocket and adapted to lie adjacent the path of the working edge of the basket lip as it passes about the sprocket and end plates formed on the ends of the panels projecting downwardly toward the guard plate, their outer edges being curved concentric with the guard plate adapted to close the space opened between the guard plate and the ends of the panels intermediate the sprocket teeth.

18. A panel for screening systems and the like, comprising a screen frame, a basket lip projecting from one face thereof, a side plate projecting from the screen frame in the same direction as, and intersecting, the basket lip, the distance between the screen panel and the outer edge of the basket lip being not greater than the distance between the screen panel and the edge of the end plate at the intersection point.

Signed at Chicago, county of Cook and State of Illinois, this 28th day of July, 1926.

CHARLES J. HOBART.